Figure 1:
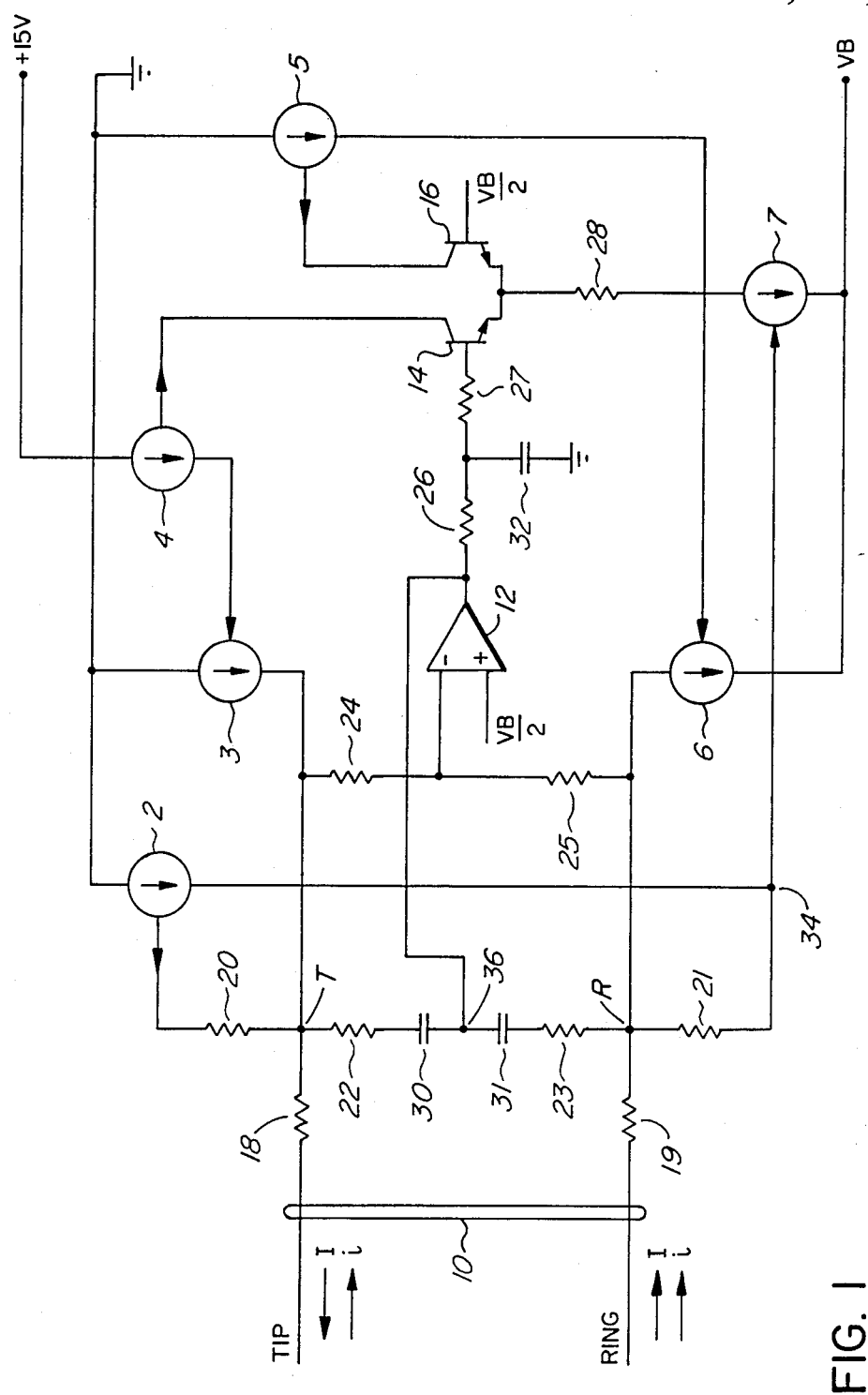
Figure 5:
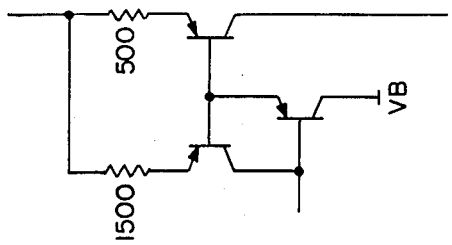
Figure 7:
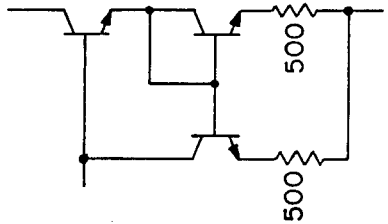
Figure 4:
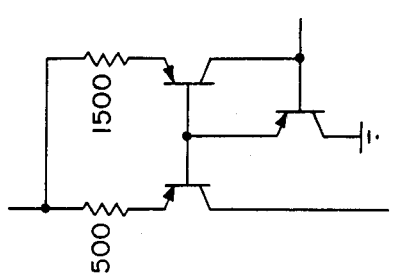
Figure 3:
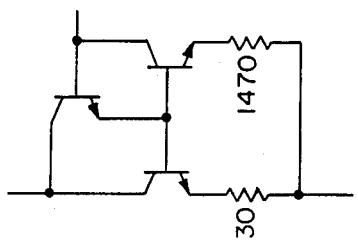
Figure 6:
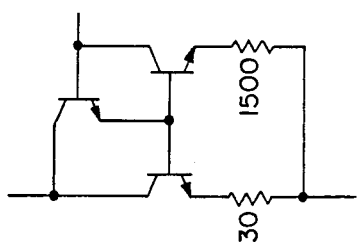
Figure 2:
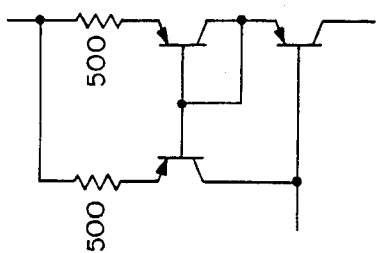

United States Patent [19]
Jakab

[11] Patent Number: 4,727,574
[45] Date of Patent: Feb. 23, 1988

[54] SUBSCRIBER LINE INTERFACE CIRCUIT WITH IMPROVED D.C. BALANCE

[75] Inventor: Gyula Jakab, Nepean, Canada

[73] Assignee: Northern Telecom Limited, Montreal, Canada

[21] Appl. No.: 780,368

[22] Filed: Sep. 24, 1985

[51] Int. Cl.[4] .......................................... H04M 19/08
[52] U.S. Cl. .................................... 379/413; 379/400
[58] Field of Search ....... 179/170 NC, 170 R, 18 FA, 179/16 F, 81 R, 16 AA, 70, 77; 379/345, 324, 384, 413, 398, 399, 400, 402, 405, 412

[56] References Cited

U.S. PATENT DOCUMENTS

| | | | |
|---|---|---|---|
| 4,300,023 | 11/1981 | Kelley et al. | 379/405 |
| 4,375,015 | 2/1983 | Chambers, Jr. | 379/345 |
| 4,445,006 | 4/1984 | Scholich | 379/402 |
| 4,467,310 | 8/1984 | Jakab | 338/22 R |
| 4,476,350 | 10/1984 | Aull et al. | 379/382 |
| 4,525,602 | 6/1985 | Robra et al. | 379/412 |
| 4,600,811 | 7/1986 | Hayashi et al. | 379/345 |
| 4,631,359 | 12/1986 | Johansson et al. | 379/324 |

FOREIGN PATENT DOCUMENTS

WO83/01162 3/1983 PCT Int'l Appl. .......... 179/170 NC

OTHER PUBLICATIONS

"One Chip Closes in on SLIC Functions", L. Brown et al., Electronic Design, Sep. 27, 1980, pp. 85-91.

*Primary Examiner*—Jin F. Ng
*Assistant Examiner*—R. Vaas
*Attorney, Agent, or Firm*—R. John Haley

[57] ABSTRACT

A SLIC includes controlled current circuits (CCCs) which simulate feed resistors for controlling d.c. feed to a two-wire telephone subscriber line which is coupled to two terminals, control being achieved via a feedback loop. A differential amplifier has an inverting input coupled to the tapping point of a potential divider connected between the terminals, and a non-inverting input connected to a reference potential of half of the supply battery voltage. For suppressing longitudinal currents on the line, the amplifier output is connected to each terminal via a d.c. blocking capacitor in series with a resistor, the resistors having closely matched resistances. For maintaining d.c. balance, the output of the amplifier is coupled via a low pass filter to control a current splitter included in the feedback loop, to control the relative proportions of control currents for the CCCs.

7 Claims, 7 Drawing Figures

SUBSCRIBER LINE INTERFACE CIRCUIT WITH IMPROVED D.C. BALANCE

This invention relates to subscriber line interface circuits (SLICs), which provide for coupling to two-wire telephone subscriber lines.

Reference is directed to my copending patent application entitled "Subscriber Line Interface Circuit with Longitudinal Current Suppression" and filed simultaneously herewith, Ser. No. 780,369, the claims of which are directed to a SLIC including features an embodiment of which is also described herein.

Many proposals exist for providing a SLIC in the form of an integrated circuit and for coupling this to a two-wire telephone subscriber line, preferably using direct coupling, i.e. without an intervening transformer. One such proposal, in which the SLIC comprises controlled current circuits (also referred to as current mirror circuits, current sources, and current sinks), is described in Kelley et al. U.S. Pat. No. 4,300,023 issued Nov. 10, 1981, and entitled "Hybrid Circuit". In this known SLIC, controlled current circuits are coupled to the tip and ring wires of the telephone subscriber line and are controlled to provide a desired d.c. feed resistance.

It is also well known that d.c. balance of two-wire telephone subscriber lines must be closely maintained. In the SLIC described in the above patent, it is assumed that d.c. balance will be achieved by virtue of the fact that the controlled current circuits, which serve to simulate d.c. feed resistors, are coupled to the tip and ring wires using a generally symmetrical or balanced arrangement and are formed in the same integrated circuit. This assumption fails in practice, however, because matching of the controlled current circuits to better than about 1% is difficult or impossible to achieve.

Accordingly, an object of this invention is to provide an improved SLIC which enables d.c. balance of a two-wire line, which is coupled to the SLIC in operation, to be enhanced.

According to this invention there is provided a subscriber line interface circuit (SLIC) comprising: two terminals for coupling to a two-wire telephone subscriber line; two controlled current circuits (CCCs) for respectively supplying current to and sinking current from the line via the terminals; a feedback loop responsive to current on the line for controlling the CCCs; and d.c. balance control means responsive to a d.c. imbalance of potentials at the terminals for controlling the feedback loop to modify the control of the CCCs to reduce the d.c. imbalance.

Thus in a SLIC in accordance with this invention the feedback control of the CCCs which serve to simulate d.c. feed resistors is modified to maintain d.c. balance.

In an embodiment of the invention the feedback loop comprises means for producing a current dependent upon the sum of direct currents flowing via the terminals; current splitting means for splitting said current into two control currents; and means for controlling the two CCCs each in dependence upon a respective one of the two control currents; wherein the current splitting means is responsive to an output of the d.c. balance control means to control the relative proportions of the two control currents.

Conveniently the current splitting means comprises two transistors having their bases coupled respectively to an output of the d.c. balance control means and to a point of reference potential, and having their emitters coupled together and supplied with said current dependent upon the sum of direct currents flowing via the terminals, and means for deriving the two control currents from the collectors of the transistors.

The d.c. balance control means preferably comprises a potential divider coupled between the terminals and having a tapping point; a differential amplifier having a first input coupled to the tapping point, a second input coupled to a point of reference potential, and an output; and low pass filter means coupled between the output of the differential amplifier and an output of the d.c. balance control means.

This arrangement also enables longitudinal currents, which are common mode alternating currents typically induced on the two-wire telephone subscriber line from adjacent power lines and/or as a result of cross-talk from other telephone lines, to be suppressed in a particularly convenient manner. To this end preferably the first input of the differential amplifier is an inverting input, and the SLIC further comprises a resistor and a capacitor coupled in series between each of the terminals and the output of the differential amplifier.

The invention will be further understood from the following description with reference to the accompanying drawings, in which:

FIG. 1 schematically illustrates parts of a subscriber line interface circuit (SLIC) in accordance with this invention; and FIGS. 2 to 7 schematically illustrate the particular forms of controlled current circuits (CCCs) used in the SLIC of FIG. 1.

Referring to FIG. 1, only those parts of a SLIC which are relevant to this invention are shown, other parts, for example for handling voice frequency signals and for applying ringing signals to a telephone subscriber line 10 to which the SLIC is connected, are not shown but are provided in known manner, for example in the manner described in Kelley et al. U.S. Pat. No. 4,300,023 already referred to.

The parts of the SLIC which are illustrated in FIG. 1 include six CCCs (controlled current circuits) 2 to 7 each of which is represented in FIG. 1 by a circle having three connections. Each CCC has a controlled current path, for which the direction of current is shown in FIG. 1 by an arrow within the respective circuit and aligned with the connections to this path, and a controlling current path for which the direction of current is shown on a side connection to the respective circle. Thus each CCC is a current mirror circuit in which the current in the controlled path is directly proportional to the current in the controlling path, with a proportionality factor which is referred to as being the gain of the circuit.

Such CCCs are generally known and can take various forms. For the sake of completeness of this description, FIGS. 2 to 7 illustrate particular forms which the CCCs 2 to 7 respectively may have in one particular embodiment of the invention, it being understood that other forms of these circuits may be adopted. The positions and orientations of FIGS. 2 to 7 correspond to those of the respective CCCs 2 to 7 in FIG. 1.

As illustrated in FIGS. 2 to 7, each CCC comprises three NPN or PNP (depending on the desired current direction) transistors, two of which have their bases interconnected and have their emitters interconnected via respective emitter resistors, resistance values for which are given in ohms in FIGS. 2 to 7. The ratio of the resistances of the emitter resistors in each CCC, which is made the same as the emitter area ratio of the transistors, determines the gain of the CCC. The third transistor of each CCC has its base connected to the controlling current path and its emitter connected to the bases of the other two transistors.

In addition to the CCCs 2 to 7, as illustrated in FIG. 1 the SLIC also includes a differential amplifier 12, a further differential amplifier constituted by two transistors 14 and 16, resistors 18 to 28, and capacitors 30 to 32. The components 2 to 7, 12, 14, 16, and 24 to 28 are conveniently formed in an integrated circuit together with other parts of the SLIC which are not shown. The SLIC is supplied with power from a negative supply voltage VB, which is nominally −48 volts and is typically derived from a telephone central office battery, and a positive supply voltage of '15 volts, both with respect to ground or 0 volts.

The CCCs 3 and 6 serve to supply (d.c.) loop current I to terminals T and R of the integrated circuit, and thence to the tip and ring wires of the subscriber line 10 via resistors 18 and 19, which have closely matched resistances of for example 200 ohms each. As described in Jakab U.S. Pat. No. 4,467,310 issued Aug. 21, 1984, these resistors can comprise thick film resistors connected in series with switching type PTC resistors, all mounted on a common substrate for thermal coupling. The loop current is controlled in dependence upon the resistances of, and is partly also supplied via, the resistors 20 and 21; for example these resistors have matched resistances of 22 kilohms each. The resistors 20 to 23 are also conveniently thick film resistors.

The part of the loop current which flows via the resistor 20 is mirrored by the CCC 2, and the resultant current is summed at a junction point 34 with the part of the loop current which flows via the resistor 21 to produce a control current for the CCC 7. The controlled path current of the CCC 7, which flows via the emitters of the transistors 14 and 16 and their common emitter resistor 28, is initially assumed to be equally shared between these two transistors to provide equal control currents for the CCCs 4 and 5. The controlled currents produced by these CCCs in turn produce equal control currents for the CCCs 3 and 6.

From the above description, it should be appreciated that the CCCs 3 and 6 serve to simulate feed resistors for supplying the loop current 1 to the subscriber line 10. For the same reasons that such feed resistors must be closely matched to provide a d.c. balanced arrangement (for example, this is needed for some automatic number identification detectors), so the CCCs 3 and 6 should be closely matched for d.c. balance purposes. However, perfect matching of these CCCs in the SLIC integrated circuit is not possible, resulting in some degree of d.c. imbalance. In the SLIC as illustrated in FIG. 1, d.c. imbalance is corrected in the manner described below.

The resistors 24 and 25 form a potential divider between the terminals T and R, and have resistances of 100 kilohms each which are matched to 0.1% to 2% depending on the integrated circuit process which is used. In a state of d.c. balance, the d.c. potential at the junction between these resistors is equal to half the supply voltage VB. The differential amplifier 12 has its inverting input connected to this junction and its non-inverting input supplied (for example from a potential divider which is not illustrated) with the voltage VB/2. Consequently, any d.c. imbalance results in the amplifier 12 producing an output signal with a d.c. component which differs from VB/2, the difference constituting an amplified error signal.

The output of the amplifier 12 is connected via a low-pass filter, constituted by the resistors 26 and 27 and the capacitor 32, to the base of the transistor 14. The resistors 26 and 27 each have a resistance of 100 kilohms, and the capacitor 32 has a capacitance of 330 nF, so that the low-pass filter has a cut-off frequency well below voice-band and power line frequencies. Consequently only the d.c. component of the signal at the output of the amplifier 12 is applied to the base of the transistor 14. The voltage VB/2 is applied to the base of the transistor 16, so that the differential amplifier formed by these two transistors is supplied with a differential input signal constituted by the amplified error signal, which thereby controls the sharing of the controlled current from the CCC 7 between the transistors 14 and 16. In consequence, the CCCs 3 and 6 are controlled to correct the d.c. imbalance.

For example, if the effective impedance of the CCC 3 is less than that of the CCC 6, then a d.c. imbalance tends to arise causing the signal at the inverting input of the amplifier 12 to have a d.c. component more positive than VB/2. In consequence, the d.c. component of the signal at the output of the amplifier 12 is more negative than VB/2, and the transistor 14 conducts less than half, and the transistor 16 conducts more than half, of the total (constant) current passed by the CCC 7. Consequently the CCCs 4 and 3 pass less current, with a corresponding increase in effective impedance, and the CCCs 5 and 6 pass more current, with a corresponding decrease in effective impedance, thereby substantially correcting the d.c. imbalance.

In addition to serving in maintaining d.c. balance in the manner described above, the resistors 24 and 25 and the amplifier 12 also serve with the resistors 22 and 23 and the capacitors 30 and 31 to compensate for longitudinal currents on the subscriber line 10. Longitudinal currents may for example arise as a result of induction from power lines and/or crosstalk from other subscriber lines, and comprise alternating currents, represented as i in FIG. 1, which flow in the same direction on both of the tip and ring wires of the subscriber line 10.

It is known to compensate for longitudinal currents by providing two commonly controlled current sinks which would be coupled to the terminals T and R. For longitudinal current balance it is necessary for such current sinks to be closely matched, for example within about 0.1%, and this is very difficult or impossible to achieve if the current sinks are formed in an integrated circuit for which matching is not normally better than 1%. This problem is avoided by the circuit illustrated in FIG. 1.

As illustrated in FIG. 1, the terminal T is coupled via the resistor 22 and the capacitor 30 to a junction point 36, and the terminal R is similarly coupled to this point 36 via the resistor 23 and the capacitor 31. The resistors 22 and 23 are for example thick film resistors each having a resistance of 500 ohms, the resistances being closely matched to within 0.1%. The capacitors 30 and 31 serve to block d.c. so that d.c. line currents are not affected by the presence of the resistors 22 and 23, and for example have capacitances of 33 microfarads and a tolerance of 5%. The junction point 36 is connected to the output of the differential amplifier 12, which acts as a controlled voltage source for longitudinal currents.

Thus in the SLIC illustrated in FIG. 1, the controlled current sinks of the prior art are replaced by the closely matched resistors 22 and 23 together with a controlled voltage source.

If, for example, the (a.c.) longitudinal current i increases, tending to make the potentials at the terminals T and R more positive, then via the resistors 24 and 25 the potential at the inverting input of the amplifier also tends to become more positive. The fixed potential VB/2 at the non-inverting input of the amplifier 12 constitutes an a.c. ground. In consequence, the potential at the output of the amplifier 12, and hence at the junction point 36, tends to become more negative, increasing the (a.c.) potential difference across the resistors 22 and 23 and thereby passing more current to compensate for the increased longitudinal current i. In consequence, the terminals T and R are virtual ground points for longitudinal alternating currents. The potentials at these terminals can change differentially, however, without affecting the potential at the inverting input of the amplifier 12, so that the desired transmission of differential voice frequency signals on the subscriber line 10 is not adversely affected.

It should be appreciated that numerous modifications, variations, and adaptations may be made to the particular embodiment of the invention described above without departing from the scope of the invention as defined in the claims.

What is claimed is:

1. A subscriber line interface circuit (SLIC) comprising:

two terminals for coupling to a two-wire telephone subscriber line;

two controlled current circuits (CCCs) for respectively supplying direct current to and sinking direct current from the line via the terminals;

a feedback loop responsive to direct current on the line for controlling the CCCs; and d.c. balance control means responsive to a d.c. imbalance of potentials at the terminals for controlling the feedback loop to modify of the CCCs to reduce the d.c. imbalance; the d.c. balance control means comprising:

a potential divider coupled betwen the terminals and having a tapping point; and a differential amplifier having a first input coupled to the tapping point, a second input coupled to a point of reference potential, and an output coupled to an output of the d.c. balance control means;

and the feedback loop comprising:

means for producing a sum current dependent upon a sum of direct currents flowing via the terminals;

current splitting means for splitting the sum current into two control currents; and means for controlling the two CCCs each in dependence upon a respective one of the two control currents;

the current splitting means being responsive to the output of the d.c. balance control means to control the relative proportions of the two control currents.

2. A SLIC as claimed in claim 1 wherein the current splitting means comprises two transistors having bases coupled respectively to the output of the d.c. balance control means and to a point of reference potential, and having emitters coupled together and supplied with the sum current, and means for deriving the two control currents from collectors of the transistors.

3. A SLIC as claimed in claim 2 wherein the d.c. balance contrl means further comprises:

low pass filter means coupled between the output of the differential amplifier and the output of the d.c. balance control means.

4. A SLIC as claimed in claim 3, wherein the first input of the differential amplifier is an inverting input, the SLIC further comprising a resistor and a capacitor coupled in series between each of the terminals and the output of the differential amplifier.

5. A SLIC as claimed in claim 3, wherein the first input of the differential amplifier is an inverting input, the SLIC further comprising a resistor and a capacitor coupled in series between each of the terminals and the output of the differential amplifier.

6. A SLIC as claimed in claim 1 wherein the d.c. balance control means further comprises:

low pass filter means coupled between the output of the differential amplifier and the output of the d.c. balance control means.

7. A SLIC as claimed in claim 1, wherein the first input of the differential amplifier is an inverting iinput, the SLIC further comprising a resistor and a capacitor coupled in series between each of the terminals and the output of the differential amplifier.

* * * * *